(12) United States Patent
Lai

(10) Patent No.: US 9,933,630 B2
(45) Date of Patent: Apr. 3, 2018

(54) SCREWLESS EYEGLASS FRAME

(71) Applicant: Ying-Ling Lai, Tainan (TW)

(72) Inventor: Ying-Ling Lai, Tainan (TW)

(*) Notice: Subject to any disclaimer, the term of this patent is extended or adjusted under 35 U.S.C. 154(b) by 16 days.

(21) Appl. No.: 15/139,116

(22) Filed: Apr. 26, 2016

(65) Prior Publication Data

US 2017/0307904 A1 Oct. 26, 2017

(51) Int. Cl.
G02C 5/22 (2006.01)
G02C 5/14 (2006.01)
G02C 5/00 (2006.01)

(52) U.S. Cl.
CPC ............ *G02C 5/2209* (2013.01); *G02C 5/008* (2013.01); *G02C 5/146* (2013.01)

(58) Field of Classification Search
CPC ........ G02C 5/006; G02C 5/008; G02C 5/146; G02C 5/2209
USPC ......................................................... 351/153
See application file for complete search history.

(56) References Cited

U.S. PATENT DOCUMENTS 8,827,444 B1 * 9/2014 Koo ..................... G02C 5/2209
351/111

FOREIGN PATENT DOCUMENTS

KR 1390038 * 4/2014 .......... G02C 5/2209

* cited by examiner

Primary Examiner — Ricky Mack
Assistant Examiner — Gary O'Neill
(74) Attorney, Agent, or Firm — Muncy, Geissler, Olds & Lowe, P.C.

(57) ABSTRACT

A screwless eyeglass frame, including a rim support, a temple support and a pivoting clip. The rim support includes a first end face and an engagement slot recessed inwardly from the first end face. The temple support includes a second end face, two extending walls extended outwardly from two corresponding sides of the second end face, respectively, and a shaft rod provided between the two extending walls. The pivoting clip includes a C-shaped buckle with resilience, two connecting legs connected with two ends of the C-shaped buckle, respectively, and an opening located between the two connecting legs. In this case, the C-shaped buckle is allowed for pivotally connecting to the shaft rod. The two connecting legs are tenoned into the engagement slot, and the temple support is capable of rotating with respect to the rim support around the shaft rod and the C-shaped buckle.

3 Claims, 6 Drawing Sheets

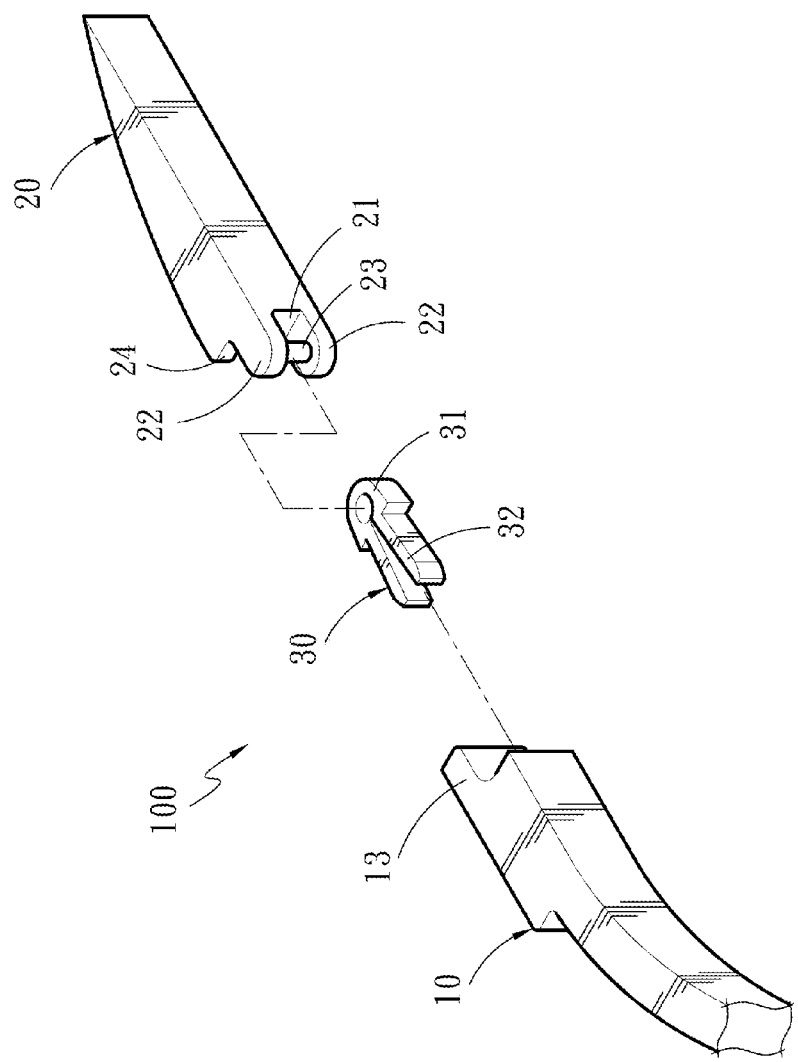

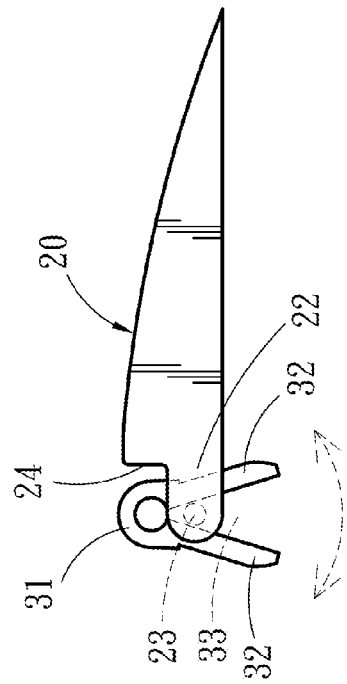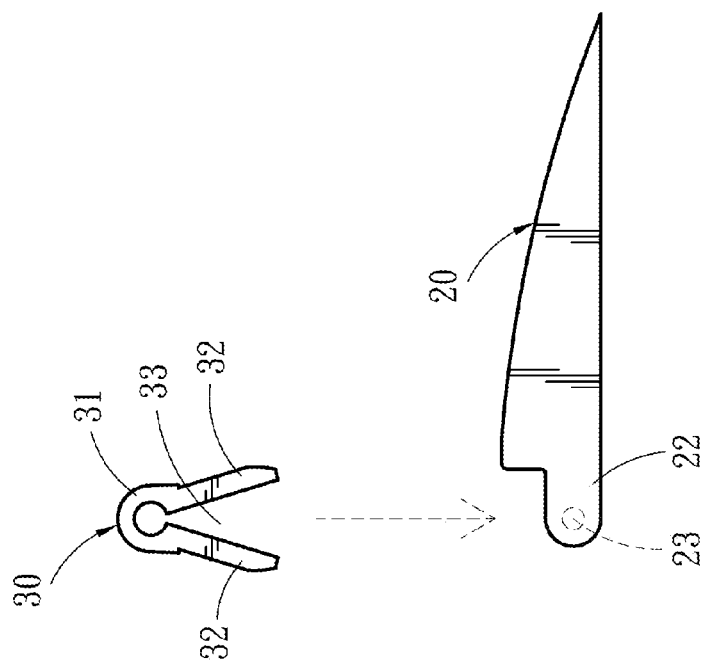

SCREWLESS EYEGLASS FRAME

FIELD OF THE INVENTION

The present invention is related to a screwless eyeglass frame, particularly to a screwless eyeglass frame capable of pivoting by multiple angles.

BACKGROUND OF THE INVENTION

In most of commercially available eyeglasses, the rim of lens is mounted at each of two sides with a temple, such that the temple is allowed for hooking over the pinna of a user. For the convenience of storing the eyeglass by the user, the conventional temple is connected to the edge of the rim through an element, such as a screw, for example. By way of appropriate adjustment of tightness of the screw, the temple is operated by the user, and rotated around the screw as the shaft center to be folded. The screw may be loose due to frequent fold, resulting in incapability of linking the temple and the rim firmly. Screwless eyeglass frames are therefore developed by several vendors. In such kinds of eyeglass frames, the structures of temples are mostly formed with resilient fold lines, hinges and etc., so as to achieve the object of pivoting of the temples with respect to the rims as well without relying on the screws.

However, the realization of structure of aforementioned screwless eyeglass frame must rely on flexibility or resilience of metal. Nevertheless, metal is hard to meet light and economical appeal of the user due to its heavier weight and higher cost. Moreover, the components made from different materials should be dismounted from the eyeglass frame, including both metal and plastic components, individually, before the frame is recycled. Thus, how to solve the aforementioned drawbacks in technology is truly the problem to be overcome by the industry desirably.

SUMMARY OF THE INVENTION

It is the object of the present invention to solve the problems of necessity of using metal material, inconvenience in recycling and etc., of the screwless eyeglass frame.

For achieving the above object, the present invention provides a screwless eyeglass frame, comprising a rim support, a temple support and a pivoting clip. The rim support comprises a first end face located at the end of the rim support, and an engagement slot recessed inwardly from the first end face. The temple support comprises a second end face located at the end of the temple support, two extending walls extended outwardly from two corresponding sides of the second end face, respectively, and a shaft rod provided between the two extending walls. The pivoting clip comprises a C-shaped buckle having appropriate resilience, two connecting legs connected with two ends of the C-shaped buckle, respectively, and an opening located between the two connecting legs and communicated with the inner edge of the C-shaped buckle. In this case, the C-shaped buckle is allowed for pivotally connecting to the shaft rod through the opening. The two connecting legs may be operably in close proximity to each other so as to close the opening. The two connecting legs in close proximity to each other are just tenoned into the engagement slot. Each of the extending walls is rested, at one side far away from the second end face, against the first end face. Moreover, the temple support is capable of rotating with respect to the rim support around the shaft rod and the C-shaped buckle.

Further, the rim support comprises a limiting block extended outwardly from the first end face. Moreover, each of the extending walls is rested at one side thereof against the limiting block, when the rim support and the temple support are assembled.

Further, the first end face is presented as a plane face, while each of the extending walls is presented, at one side far away from the second end face, as a curved face.

Further, the first end face, and one side of each of the extending walls far away from the second end face are all presented as curved faces.

In comparison with the prior art, therefore, there are advantageous effects inherent in the present invention as follows:

1. A mortise and tenon joint is adopted in the screwless eyeglass frame of the present invention, such that the rim support/the temple support are mutually formed as correspondingly slidable installations, so as to obtain the function of screwless fold. In addition, the screwless eyeglass frame of the present invention may be wholly made from plastic, so as to eliminate the cost for necessarily dismounting metal material on recycling.

BRIEF DESCRIPTION OF THE DRAWINGS

FIG. 1 is an exploded perspective view of a screwless eyeglass frame of the present invention.

FIGS. 2A to 2B are schematic diagrams of the operation of connection between a temple support and a pivoting part of the present invention.

DETAILED DESCRIPTION OF THE PREFERRED EMBODIMENTS

Figure 3A:
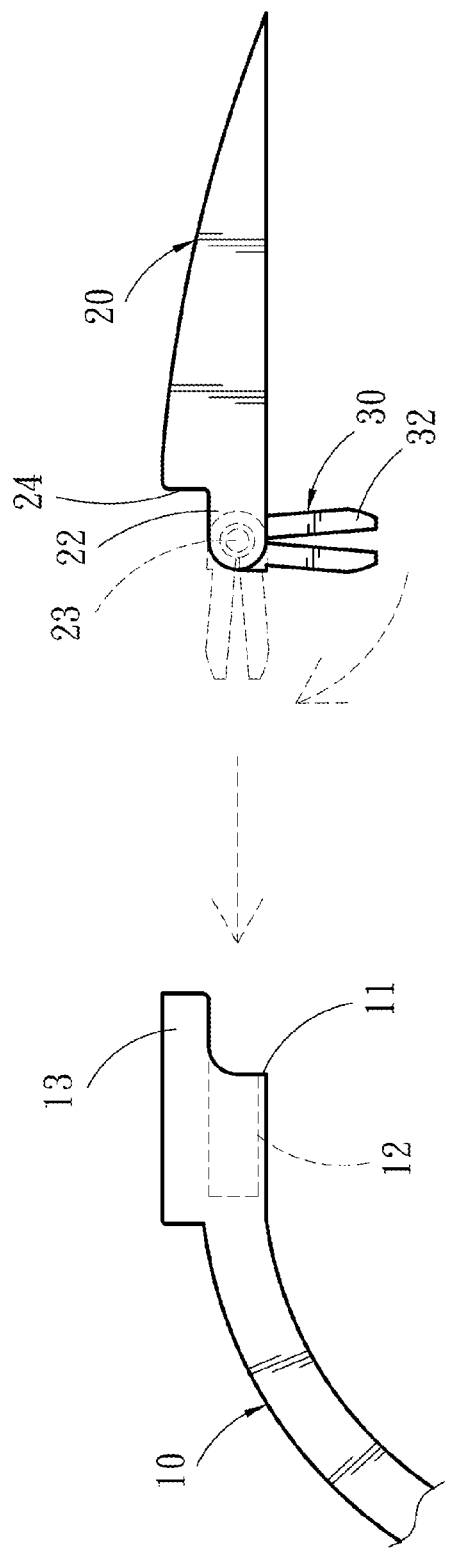
FIGS. 3A to 3B are schematic diagrams of the operation of connection between the temple support and a rim support of the present invention.
Figure 3B:
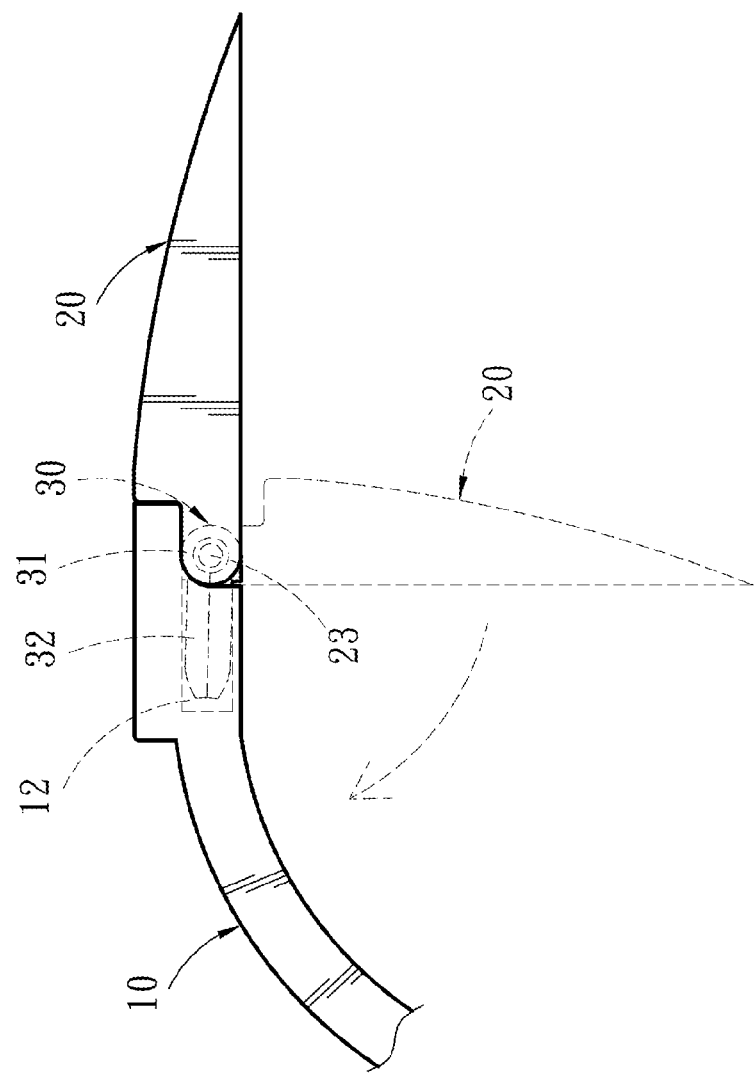

Several preferred embodiments with regard to technical features and operating modes of this application will be disclosed hereinafter, in connection with the drawings, to be reviewed. However, these embodiments are illustrative for technical contents of the present invention only. Further, the drawings in the present invention are not necessarily to scale for convenience of illustration. The scale of the drawings should not be construed as limiting the scope of this disclosure.

Referring to FIG. 1, there is shown technology with regard to the present invention. The present invention provides a screwless eyeglass frame 100, mainly applied to mutual connection between a rim of lens and a temple support. The screwless eyeglass frame 100 comprises a rim support 10, a temple support 20 and a pivoting clip 30.

Specifically, referring to FIGS. 2A, 2B, 3A and 3B together, the rim support 10 comprises a first end face 11 located at the end of the rim support 10, and an engagement slot 12 recessed inwardly from the first end face 11. The temple support 20 comprises a second end face 21 located at the end of the temple support 20, two extending walls 22 extended outwardly from two corresponding sides of the second end face 21, respectively, and a shaft rod 23 provided between the two extending walls 22.

Figure 4A:
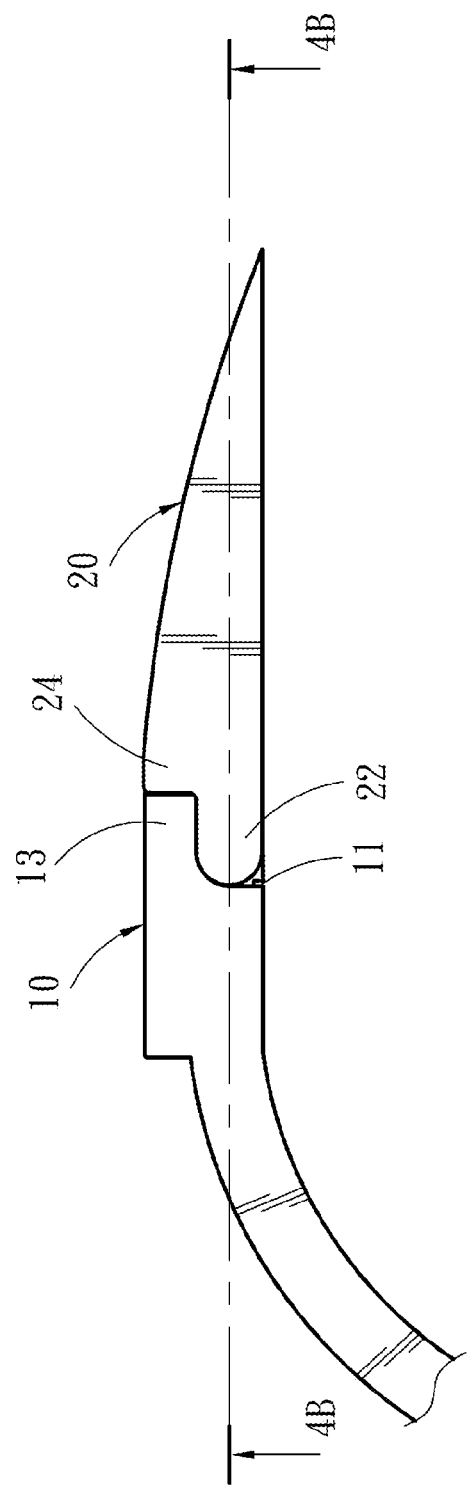
FIG. 4A is an assembled perspective view of the screwless eyeglass frame of the present invention.
Figure 4B:
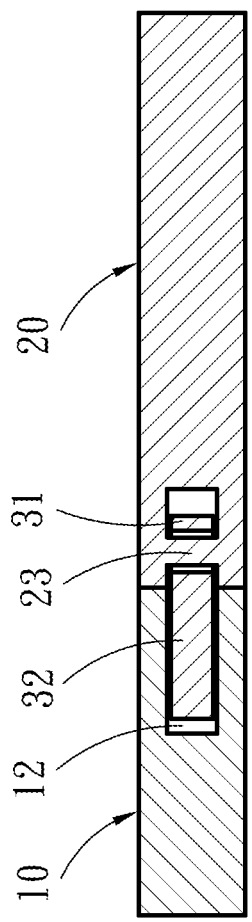
FIG. 4B is a cross-sectional view taken along line 4B-4B of FIG. 4A.

Further, referring to FIGS. 4A and 4B, the pivoting clip 30 comprises a C-shaped buckle 31 having appropriate resilience, two connecting legs 32 connected with two ends of the C-shaped buckle 31, respectively, and an opening 33 located between the two connecting legs 32 and communicated with the inner edge of the C-shaped buckle 31. In this case, the shaft rod 23 is allowed for passing through the opening 33 of the C-shaped buckle 31, and the C-shaped buckle 31 is allowed for fastening around the shaft rod 23 through its own resilience. The two connecting legs 32 may be operated by the user to be in close proximity to each other, and to close the opening 33. The two connecting legs 32 in close proximity to each other are just tenoned into the engagement slot 12. In the meanwhile, each of the extending walls 22 is rested, at one side far away from the second end face 21, against the first end face 11. Thereby, the object of rotation of the temple support 20 with respect to the rim support 10 around the shaft rod 23 and the C-shaped buckle 31 is achieved.

In this embodiment, the rim support 10 comprises a limiting block 13 extended outwardly from the first end face 11. Moreover, each of the extending walls 22 is rested, at one side far away from the second end face 21, against the limiting block 13, when the rim support 10 and the temple support 20 are assembled. In this embodiment, the limiting block 13 is equivalent in length to each of the extending walls 22. Consequently, the limiting block 13 is rested, at one side far away from the first end face 11, against an abutment 24 on the second end face 21, when the rim support 10 and the temple support 20 are assembled. Thereby, the rotatable angle of the temple support 20 is constrained. In this case, the first end face 11 is presented as a plane face, while each of the extending walls 22 is presented, at one side far away from the second end face 21, as a curved face, so as to facilitate smooth rotation of the temple support 20 with respect to the rim support 10. Also, in another embodiment, the first end face 11, and one side of each of the extending walls 22 far away from the second end face 21 are all presented as curved faces, just depending upon the requirement of the user.

To sum up, a mortise and tenon joint is adopted in the screwless eyeglass frame 100 of the present invention. The first end face 11 and the second end face 21 of the corresponding rim support 10/temple support 20, respectively, are mutually formed as slidable corresponding faces, so as to obtain the function of screwless fold. Furthermore, the whole structure does not rely on structural strain characteristic of metal, because no construction, such as fold line, hinge and etc., for example, is used for folding. Therefore, the screwless eyeglass frame of the present invention may be completely made from plastic, resulting in not only lighter weight of product, but also more competitive cost and recycling process than the conventional screwless eyeglass frame.

While this invention has been detailed described in connection with what is presently considered to be preferred embodiments, it should be understood that the invention is not limited to the disclosed embodiments. That is to say, various variations and modifications made in accordance with the patent claims should fall within the scope of the present invention.

What is claimed is:

1. A screwless eyeglass frame, comprising:
    a rim support comprising a first end face located at the end of said rim support, and an engagement slot recessed inwardly from said first end face, and a limiting block extended outwardly from said first end face;
    a temple support comprising a second end face located at the end of said temple support, two extending walls extended outwardly and disposed separately from two corresponding sides of said second end face, respectively, and a shaft rod provided between said two extending walls; and
    a pivoting clip comprising a C-shaped buckle having resilience, two connecting legs uniformly extended from said C-shaped buckle, respectively, and an opening located between said two connecting legs and communicated with the inner edge of said C-shaped buckle, the pivoting clip including a first state which defines an included angle smaller than 90° while said two connecting legs are not being oppressed, and a second state with the opening being narrowed while said two connecting legs are being oppressed;
    wherein said C-shaped buckle allows for pivotally connecting to said shaft rod through said opening, the pivoting clip being in said second state for a long time while said rim support and said temple support are assembled, the pivoting clip being an axis to rotate said temple support in opposition to said rim support, the rotation of said temple support being restricted while said limiting block rests against said extending wall, said limiting block corresponding to part of said second end face without two extending walls, and said two extending walls corresponding to part of said first end face without said limiting block when the rotation of said temple support is restricted.

2. The screwless eyeglass frame according to claim 1, wherein said first end face is a plane face, while each of said extending walls is, at one side far away from said second end face, as a curved face.

3. The screwless eyeglass frame according to claim 1, wherein said first end face, and one side of each of said extending walls far away from said second end face are all curved faces.

* * * * *